United States Patent
Manning et al.

(10) Patent No.: US 6,224,268 B1
(45) Date of Patent: May 1, 2001

(54) PLUG HOUSING WITH ATTACHED CANTILEVERED LATCH FOR A FIBER OPTIC CONNECTOR

(75) Inventors: Randy Marshall Manning, New Cumberland; Bryan Thomas Edwards, Camp Hill; Shelly Ann Buchter, East Berlin; Robert Carl Briggs, Newport, all of PA (US)

(73) Assignee: The Whitaker Corporation, Wilmington, DE (US)

( * ) Notice: Subject to any disclaimer, the term of this patent is extended or adjusted under 35 U.S.C. 154(b) by 0 days.

(21) Appl. No.: 09/064,952

(22) Filed: Apr. 23, 1998

(51) Int. Cl.[7] ....................................................... G02B 6/38
(52) U.S. Cl. ................................................. 385/56; 385/76
(58) Field of Search .................................. 385/56–79, 147

(56) References Cited

U.S. PATENT DOCUMENTS

| | | | |
|---|---|---|---|
| 3,999,837 | * 12/1976 | Bowen et al. | 385/54 |
| 4,186,999 | * 2/1980 | Harwood et al. | 385/66 |
| 4,759,599 | 7/1988 | Yamaguchi et al. | 350/96.21 |
| 5,325,455 | * 6/1994 | Henson et al. | 385/89 |
| 5,481,634 | 1/1996 | Anderson et al. | 385/76 |
| 5,524,160 | 6/1996 | Debeaux et al. | 385/92 |
| 5,717,802 | * 2/1998 | Briggs et al. | 385/75 |
| 5,720,653 | * 2/1998 | Miller et al. | 451/278 |
| 5,828,804 | * 10/1998 | Akins et al. | 385/58 |

FOREIGN PATENT DOCUMENTS

| | | |
|---|---|---|
| 0 685 750 | 12/1995 | (EP) . |
| 58-0585 10 | 4/1983 | (JP) . |
| 58-090607 | 5/1983 | (JP) . |
| 59-140410 | 8/1984 | (JP) . |

* cited by examiner

Primary Examiner—Akm E. Ullah
(74) Attorney, Agent, or Firm—June B. Schuette

(57) ABSTRACT

A novel forward-facing, aft-attached cantilever beam is provided as a latch for securing a fiber optic connector to a receptacle. The beam has engagement structure on its free end which attaches to the receptacle. The connector includes a plug housing formed from a member having a forward end and a rearward end and an axial passageway therethrough through which at least one optical fiber provided in the fiber optic cable extends. The forward end is inserted into the receptacle with the rearward end extending from the receptacle. The cantilevered beam has an end fixed to a rearward portion of the member and its free end extends forwardly toward the forward end of the member. To engage the connector with the receptacle, the free end of the cantilevered beam is biased toward the member and the member is slid into the receptacle. Once fully inserted, the engagement structure on the cantilevered beam engages retention structure in the receptacle. The connector can be released from engagement with the receptacle by biasing the cantilevered beam such that the engagement structure on the beam is released from the retention structure of the receptacle and thereafter pulling the connector out of the receptacle.

28 Claims, 4 Drawing Sheets

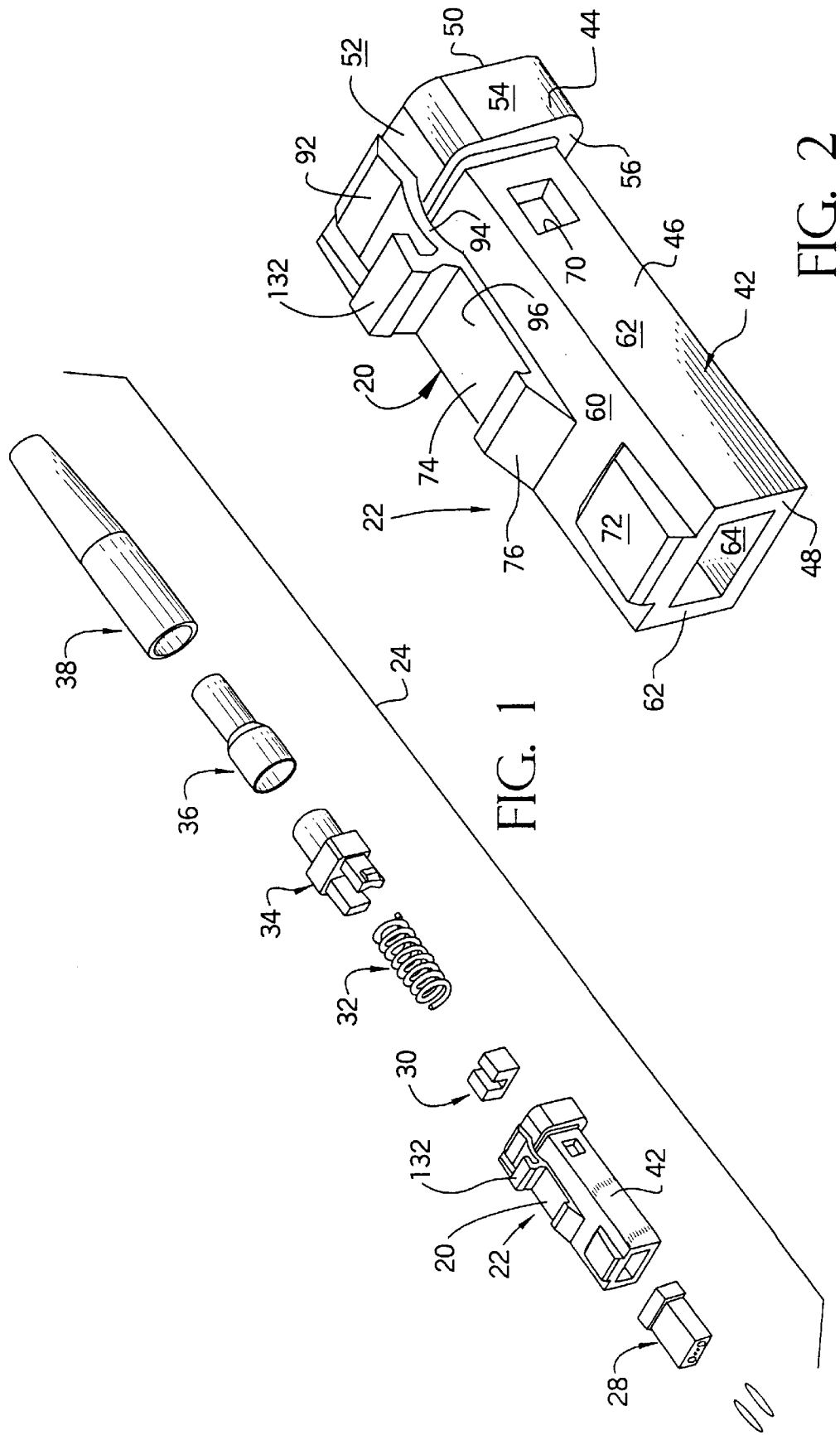

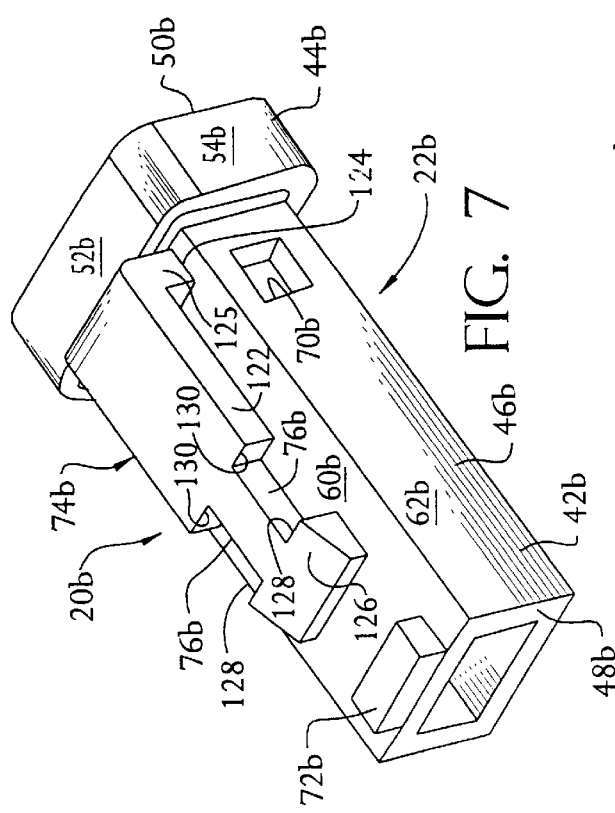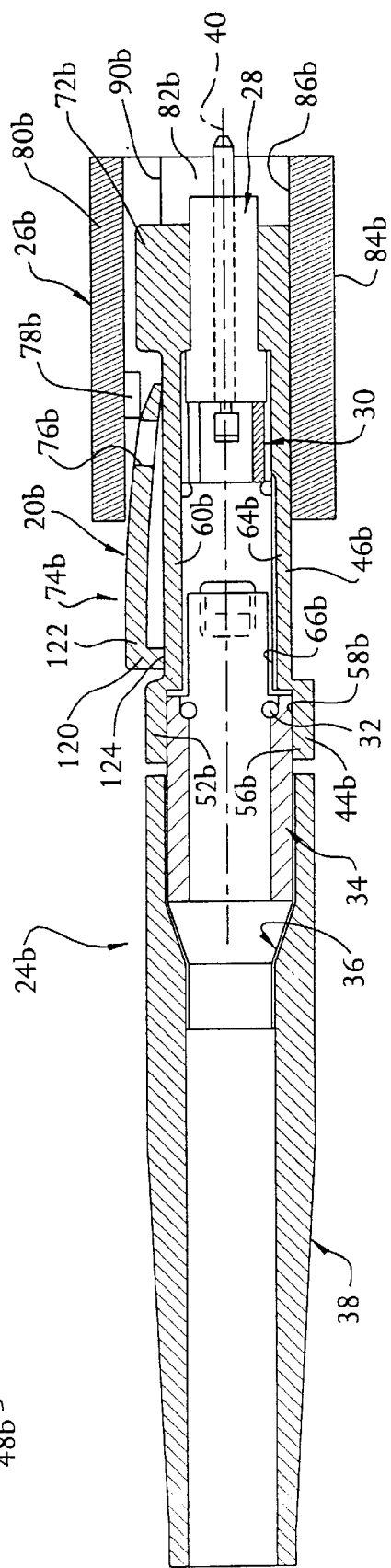

PLUG HOUSING WITH ATTACHED CANTILEVERED LATCH FOR A FIBER OPTIC CONNECTOR

BACKGROUND OF THE INVENTION

The present invention relates generally to connectors preferably for use with fiber optics, and more specifically relates to a novel latch structure for mounting a connector to a receptacle.

Fiber optic technology presents several advantages which cannot be provided by other technologies. For example, fiber optic communication systems provide immunity from electromagnetic interference (EMI), provide virtually unlimited bandwidth, and provide that data can be quickly transferred over long distances.

Typically, connectors are used within optical fiber communication systems. For example, connectors are used to join optical fibers together to form a longer length or to connect an optical fiber to a device. Generally, a connector must provide that the end of one optical fiber becomes axially aligned with the end of another optical fiber. As a result, after the connection is made, all of the light from one optical fiber can travel into the other optical fiber. Because optical fibers are extremely small and because it is important that no data be lost at the point at which two optical fibers are joined, it is important that a connector be able to join two optical fibers with a relatively high amount of accuracy and precision.

Fiber optic connectors are often used in environments where there are many loose and/or hanging wires, such as copper conductor wires or other optical fibers. Examples of such environments include a patch panel, a patch enclosure and an electrical closet. Within environments such as these, it is advantageous to provide a connector which is not prone to entanglement on the wires. Entanglement with wires during connection or disconnection of a connector can provide that the wires become damaged or some portion of the connector becomes damaged.

Fiber optic connectors are also often used in high-traffic environments, such as on a desktop. Using a connector to connect optical fibers within a high-traffic environment requires that the connector be durable enough to withstand the environment.

It is desirable to be able to terminate an optical fiber in the field rather than having to be terminated in the factory into specific lengths of patch cords. By providing that a connector can be terminated in the field, project estimates need not assume much longer fiber optic cables in order to ensure that the cables will be long enough during actual installation.

Of course, it is also desirable to provide a connector where the connector includes as few parts as possible and is relatively inexpensive to produce.

The present invention provides a novel structure for mounting a connector to a receptacle which features and advantages thereof will become apparent upon a reading of the attached specification in combination with a study of the drawings.

OBJECTS AND SUMMARY OF THE INVENTION

It is a general object of the present invention to provide a novel latch structure on a plug housing, such plug housing forming part of a connector, for mounting a connector to a receptacle, such connector being used to terminate a fiber optical cable.

An object of the present invention is to provide a plug housing in a connector, such plug housing having a novel latch structure thereon which is ideal for use in environments where loose and/or hanging wires often can be found, such as on a patch panel, in a patch enclosure or in an electrical closet.

Another object of the present invention is to provide a plug housing having a novel latch structure thereon in a connector, such connector being used to terminate an optical fiber, and such latch structure not being prone to entanglement with loose and/or hanging wires during engagement or disengagement of the connector.

Still yet another object of the present invention is to provide a novel latch structure for a connector which is durable and not prone to breaking during use.

Briefly, and in accordance with the foregoing, the present invention discloses a novel forward-facing, aft-attached cantilever beam which is provided as a latch structure on a plug housing for securing a fiber optic connector to a receptacle. The beam has engagement structure on its free end which attaches to retention structure within the receptacle. The plug housing has a forward end and a rearward end and an axial passageway therethrough through which at least one optical fiber provided in the fiber optic cable extends. The forward end is inserted into the receptacle with the rearward end extending from the receptacle. The cantilevered beam has an end fixed to a rearward portion of the plug housing and its free end extends forwardly toward the forward end of the plug housing. To engage the connector with the receptacle, the connector is slid into an axial passageway through the receptacle, whereupon the cantilevered beam is biased toward the top wall of the plug housing upon engagement with the receptacle. Once fully inserted, the engagement structure on the cantilevered beam engages retention structure in the receptacle. The connector can be released from engagement with the receptacle by biasing the cantilevered beam toward the top wall of the plug housing such that the engagement structure on the beam is released from the retention structure of the receptacle and thereafter, pulling the connector out of the receptacle.

The retention structure of the receptacle may be formed as an aperture through a wall of the receptacle and the engagement structure on the cantilevered beam may be formed as a protrusion which is adapted for engagement within the aperture. Alternatively, the retention structure of the receptacle may be formed as at least one protrusion within the axial passageway of the receptacle and the engagement structure on the cantilevered beam may be formed as at least one notch in the beam which is adapted for engagement with the protrusion within the receptacle.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is an exploded perspective view of the components of a connector, including a plug housing, which is used to mount a fiber optic cable to a receptacle which incorporates the features of an embodiment of the invention;

FIG. 2 is an enlarged perspective view of the plug housing shown in FIG. 1;

FIG. 7 is a enlarged perspective view of another alternate embodiment of the plug housing which incorporates the features of the invention; and FIG. 8 is an assembled, cross-sectional of the connector with the alternate embodiment of the plug housing as shown in FIG. 7, partially inserted into a receptacle which is shown in cross-section.

DETAILED DESCRIPTION OF THE ILLUSTRATED EMBODIMENT

Figure 3:
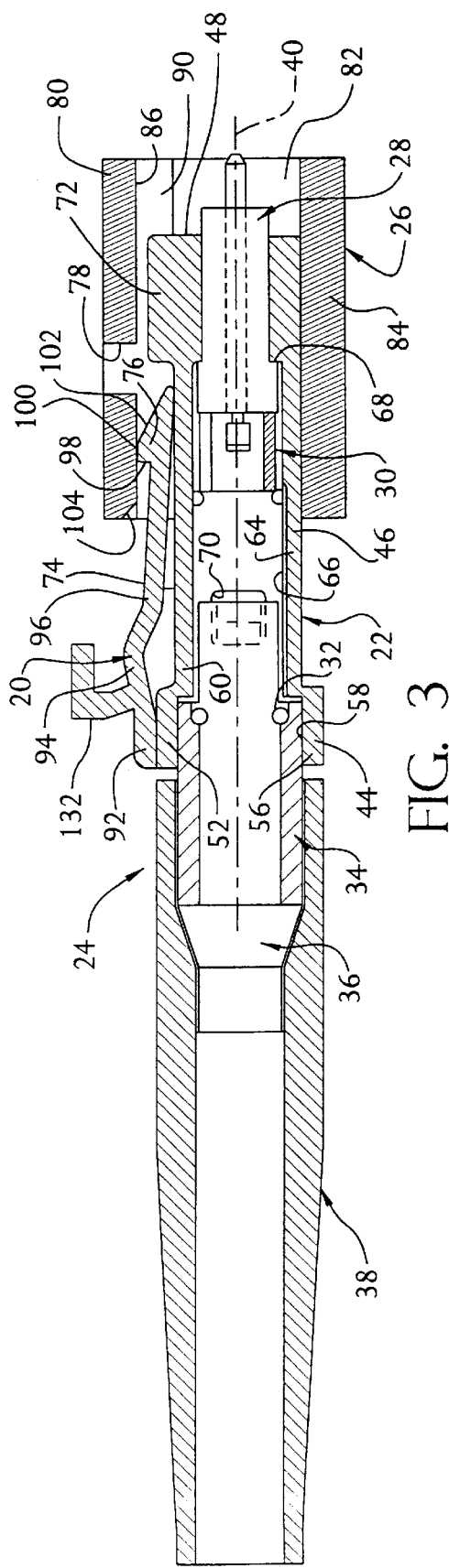
FIG. 3 is an assembled, cross-sectional of the connector shown in FIG. 1, partially inserted into a receptacle which is shown in cross-section.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 5:
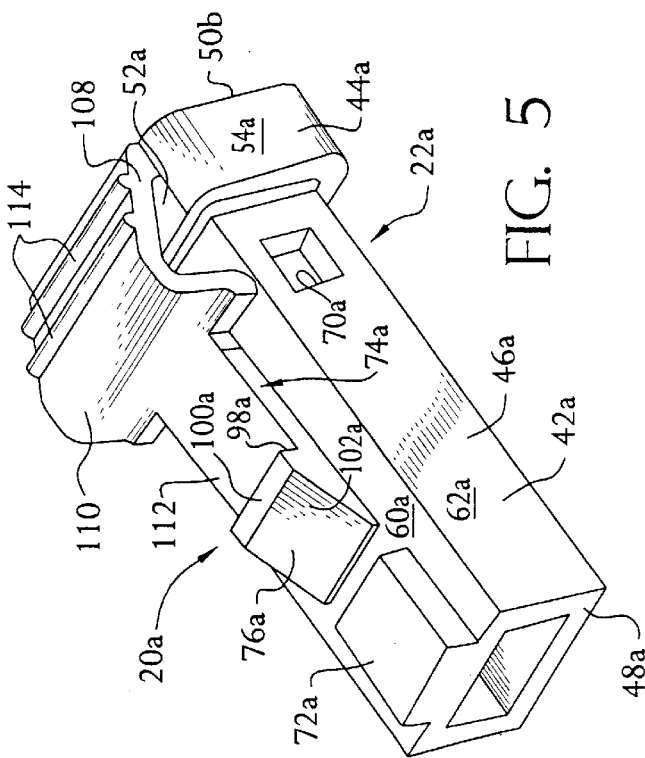
FIG. 5 is an enlarged perspective view of an alternate embodiment of the plug housing which incorporates the features of the invention.
Figure 6:
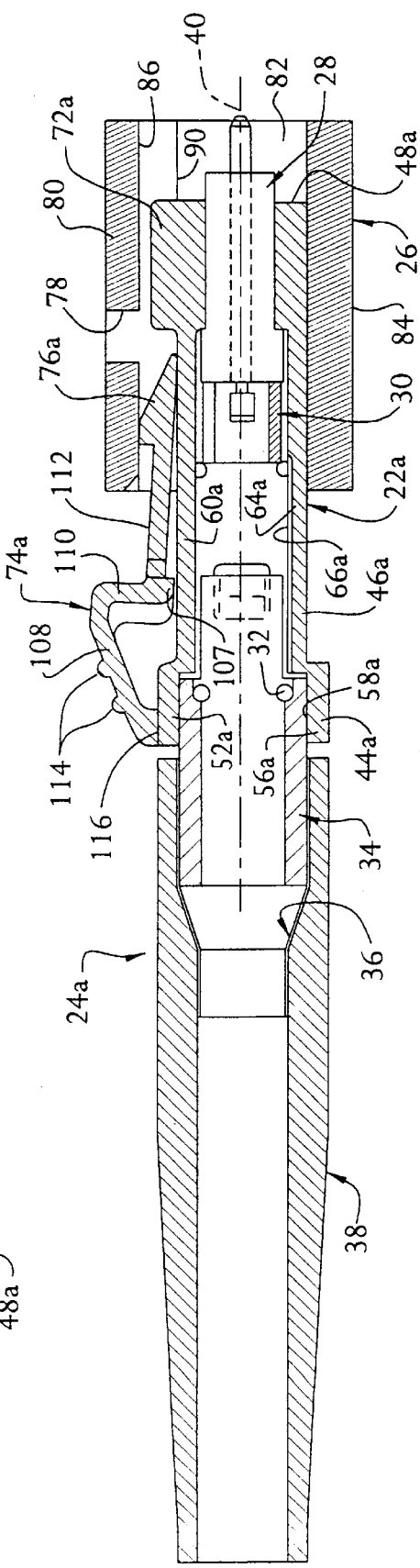
FIG. 6 is an assembled, cross-sectional of the connector with the alternate embodiment of the plug housing as shown in FIG. 5, partially inserted into a receptacle which is shown in cross-section.

As shown in the drawings, the present invention provides a novel latch structure 20 for a plug housing 22 which is provided a component of a fiber optic connector 24. A first embodiment of the novel latch structure 20 provided on the plug housing 22 is shown in FIGS. 1–4; a second embodiment of the novel latch structure 20a provided on the plug housing 22a is shown in FIGS. 5 and 6; a third embodiment of the novel latch structure 20b provided on the plug housing 22b is shown in FIGS. 7 and 8. Like elements of the plug housings 22, 22a, 22b are labeled with like reference numerals, with the elements of the second embodiment having the suffix "a" after the reference numeral and the elements of the third embodiment having the suffix "b" after the reference numeral. The first and second embodiments of the latch structure 20, 20a are "high profiles latches and the third embodiment of the latch structure 20b is a "low profile" latch.

The plug housing 22 is one component in the connector 24, such connector 24 being mounted to a receptacle 26 as described herein and which is used to terminate a conventional fiber optic cable (not shown). As will be appreciated from a study of the drawings, especially FIGS. 3, 4, 6 and 8, only one side of the connection is shown. One of ordinary skill in the art will recognize that the receptacle 26 is mounted in or to a member, such as a wall, and has a like receptacle 26 mounted on the other side of the member for terminating a like fiber optic cable with a like connector 24 such that the ends of the optical fibers in the fiber optic cables can be connected together so that data, in the form of light, can be transmitted. It will also be appreciated that the connector 24, which incorporates the novel features of the present invention, can be used to terminate copper wires, however, the description herein describes the connector 24 for use in terminating fiber optic cables.

The fiber optic cable (not shown) which is terminated by the present connector 24 is known in the art. Fiber optic cables may be a pair of thin channels or optic fibers which are formed of glass. The thin glass fibers are typically coated with layers of ultraviolet-curable materials for protection. The coated fibers are then covered with a thermoplastic having sufficient stiffness to preclude fiber buckling. Strength yarns or other suitable strength members surround the coated and covered fibers to withstand tensile forces, which can be caused by pulling on the fiber optic cable, which could otherwise break the fibers. Suitable strength yarns may be made of fibrous aramid material. An outer jacket, which may be made of polyvinyl chloride, surrounds the coated and covered fibers and the strength yarns.

The connector 24 includes a plurality components and specifically, includes the plug housing 22, 22a, 22b, a ferrule member 28, a U-shaped guide pin clip 30, a cylindrical, coiled compression spring 32, a spring push member 34, a crimpable eyelet 36 and a strain relief boot 38. As shown in FIGS. 3, 4, 6 and 8, a forward end of each component of the connector 24 is on the right and a rearward end of each component of the connector 24 is on the left. A central axis of the connector 24 is provided along line 40. The ferrule member 28 and the guide pin clip 30 are mounted within a forward portion of the plug housing 22, 22a, 22b and the ferrule member 28 extends outwardly from a front end of the plug housing 22, 22a, 22b. The front portion of the spring push member 34 is mounted to a rear portion of the plug housing 22, 22a, 22b and the compression spring 32 is mounted within the plug housing 22, 22a, 22b between the spring push member 34 and the guide pin clip 30. A rear portion of the spring push member 34 extends outwardly from the rear end of the plug housing 22, 22a, 22b. A forward portion of the crimpable eyelet 36 is mounted on a rear portion of the spring push member 34 and finally, a forward portion of the strain relief boot 38 overlaps and covers the crimpable eyelet 36. The specifics of the guide pin clip 30, the spring push member 34, the crimpable eyelet 36 and the strain relief boot 38 are known in the art. The crimpable eyelet 36 and the strain relief boot 38 are used to connect the fiber optic cable to the connector 24 in a manner known in the art. As such, each component of the connector 24 is only generally described herein.

Attention is now directed to FIGS. 2, 5 and 7 for an explanation of the structure of the plug housing 22, 22a, 22b. For ease in description, the general structure of the plug housing 22, 22a, 22b, with the exception of the novel latch structure 20, 20a, 20b, is described with respect to the first embodiment of the plug housing 22 shown in FIGS. 1–4 with the understanding that the other embodiments of the plug housing 22a, 22b are the same. The plug housing 22 is formed from a thermoplastic member 42 which includes a base portion 44 integrally formed with a portion 46 which extends therefrom. A front end of the plug housing 22 is defined at 48 and a rear end of the plug housing 22 is defined at 50. The terms "forward" and "rearward" are defined in this manner because the forward end of the plug housing 22 is defined as the end which is first inserted into the receptacle 26.

The base portion 44 has a top wall 52, opposite side walls 54 (only one of which is shown) and a bottom wall 56. The top and bottom walls 52, 56 are spaced apart from each other, and the side walls 54 are spaced apart from each other, to define a rectangular axial passageway 58 through the base portion 44.

The extending portion 46 is generally rectangularly-shaped and has a top wall 60, opposite side walls 62 and a bottom wall 64. The top and bottom walls 60, 64 are spaced apart from each other, and the side walls 62 are spaced apart from each other, to define a rectangular axial passageway 66 through the extending portion 46, such rectangular axial passageway 66 being aligned with the rectangular axial passageway 58 through the base portion 44. A shoulder 68 is formed along a portion of the rectangular axial passageway 66 to define a smaller portion of the extending portion axial passageway 66. An aperture 70 is provided through each of the side walls 62 along a rear portion of the extending portion 46.

The top and bottom walls 52, 56 of the base portion 44 are spaced further apart from each other than the top and bottom walls 60, 64 of the extending portion 46 such that the axial passageway 58, while in alignment with the axial passageway 66, is larger than the axial passageway 66. The base portion 44 is formed at the rear end of the plug housing 22 such that the extending portion 46 extends forwardly therefrom.

A key 72 is integrally formed on the top wall 60 of the extending portion 46 proximate to the forward end 48 thereof for reasons described herein. The key 72 is generally rectangular-shaped and protrudes upwardly from the extending portion top wall 60.

Now that the generalities of the plug housing 22, 22a, 22b have been described, the specifics of each embodiment of the novel latch structure 20, 20a, 20b is described. The latch structure 20, 20a, 20b can be integrally formed with the member 42, or can be provided as a separate member made out of metal or plastic which is suitably mounted on the member 42. The latch structure 20, 20a, 20b is made out a material which has "memory", that is, it can be biased under the application of force and will return to its initial shape when the force is removed. The high profile embodiments of the latch structure 20, 20a engage with a different type of receptacle 26 than the low profile embodiment of the latch structure 20b as described herein.

Generally, each embodiment of the latch structure 20, 20a, 20b provides a forward-facing, aft-attached cantilever beam 74, 74a, 74b. The beam 74, 74a, 74b has engagement structure 76, 76a, 76b on its free end which engages with retention structure 78 of the receptacle 26.

Figure 4:
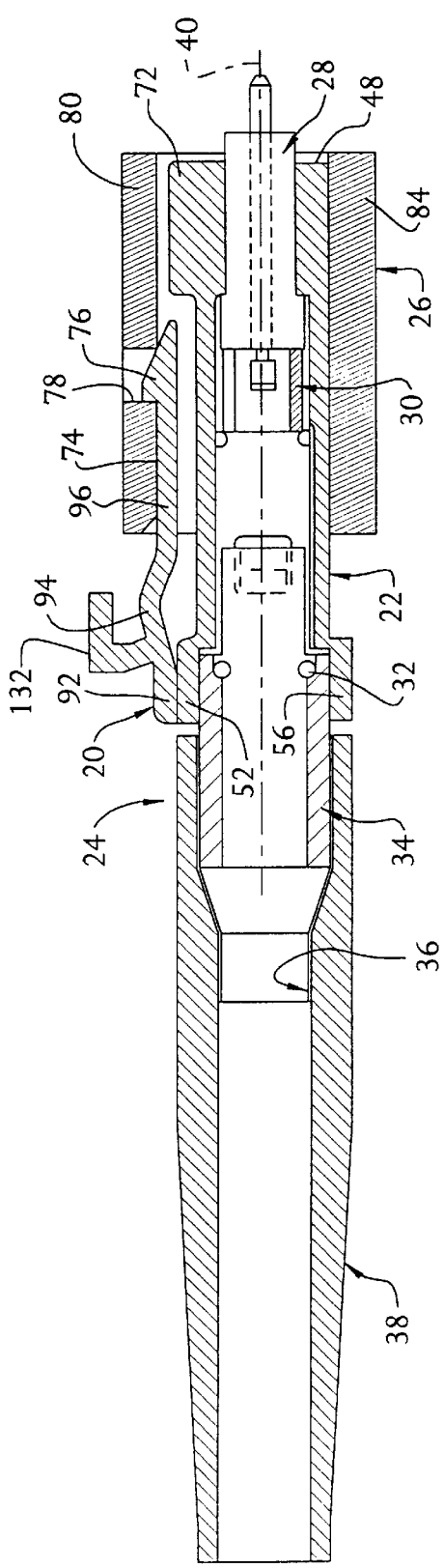
FIG. 4 is an assembled, cross-sectional of the connector shown in FIG. 1, fully inserted into the receptacle which is shown in cross-section.

Attention is now directed to FIGS. 2–4 which illustrates the first embodiment of the plug housing 22 which has an embodiment of the high profile latch structure 20 thereon, and the receptacle 26 in which the connector 24 is mounted.

The receptacle 26 is rectangular-shaped and has a top wall 80, opposite side walls 82 and a bottom wall 84. The top and bottom walls 80, 84 are spaced from each other and the side walls 82 are spaced from each other so as to define a rectangularly-shaped axial passageway 86 which extends through the receptacle 26. The retention structure 78 takes the form of a retention aperture provided through the top wall 80 of the receptacle 26 for acceptance of the engagement member 76 on the latch structure 20. A keyway 90 is provided in a forward end of the receptacle passageway 86 for acceptance of the key 72 as described herein.

The latch structure 20 is formed from a forward extending, aft-mounted cantilevered beam 74. The beam 74 is formed from a first, flat portion 92 having forward and rearward opposite ends, a second, generally arcuate portion 94 having forward and rearward opposite ends, and a third, elongated, flat portion 96 having forward and rearward opposite ends. The first portion 92 is provided on the top wall 52 of the base portion 44 and may be integrally formed therewith or may be formed as a separate member and suitably mounted thereon. In addition, the first portion 92 may be provided on the top wall 60 of the extending portion 46. The rearward end of the second, arcuate portion 94 is integrally formed with the forward end of the first portion 92; the rearward end of the third portion 96 is integrally formed with the forward end of the second, arcuate portion 94. Thus, the second, arcuate portion 94 and the third, flat portion 96 extend freely forward toward the front end 48 of the plug housing 22 over the extending portion 46. That is to say, the second and third portions 94, 96 of the beam 74 can be biased toward the top wall 60 of the extending portion 46. When not connected with the receptacle 26, the beam 74 may have a bias which is slightly away from the top surface 60 of the extending portion 46.

The engagement structure 76 is formed as a protrusion on the forwardmost end of the beam third portion 96. Specifically, the protrusion 76 has a first surface 98 which is generally perpendicular to the top surface of the third portion 96, a second surface 100 which is generally perpendicular to the first surface 98, and a ramped third surface 102 which inclines downwardly from the forward end of the second surface 100 to the underside of the beam 74.

The key 72 provided on the extending portion top wall 60 is spaced slightly forward of the forwardmost end of the beam 74.

To engage the plug housing 22 with the receptacle 26, the forward end of the plug housing 22 is inserted within the receptacle passageway 86 such that the bottom wall 64 of the extending portion 46 slides along the interior of the bottom wall 84. When the beam 74 comes into contact with the top wall 80 of the receptacle 26, the beam 74 flexes toward the top wall 60 of the extending portion 46. The ramped surface 102 of the protrusion 76 encourages the biasing of the beam 74 toward the top wall 60. The portion 104 of the receptacle top wall 80 which initially comes into contact with the ramped surface 102 may be beveled so as to promote the biasing of the beam 74. As the plug housing 22 is moved further into the receptacle 26, the second surface 100 of the protrusion 76 slides along the interior of the top wall 80, see FIG. 3, until the protrusion 76 engages the retention aperture 78 through the receptacle top wall 80, see FIG. 4. Once the protrusion 76 encounters the retention aperture 78, the beam 74 flexes and moves away from the extending portion top wall 60 as a result of the memory in the beam material and the protrusion 76 engages within the retention aperture 78. Specifically, surface 98 of the protrusion 76 engages the rear wall of the aperture 78. This locks the plug housing 22 into place within the receptacle 26 under an axial load. The top and bottom walls 80, 84 of the receptacle 26 are spaced slightly closer together than the distance between the bottom surface of the extending portion 46 and the top surface of the beam 74 in its initial position so that a tight interconnection is provided.

To disengage this embodiment of the high profile plug housing 22 from the receptacle 26, the user presses on a deflector 132 on the beam 74 which causes the beam 74 to flex and move toward the extending portion top surface 60. Once the protrusion 76 is completely disengaged from the retention aperture 78, the plug housing 22 can be easily and freely pulled out of the receptacle 26.

Attention is now directed to FIGS. 5 and 6 which illustrates the second and preferred embodiment of the plug housing 22a which also has an embodiment of the high profile latch structure 20a thereon, and the receptacle 26 in which the connector 24a is mounted. The receptacle 26 in the second embodiment is identical to that of the first embodiment and therefore, identical reference numerals are used in the drawings and the description is not repeated. The member 42a is identical to the member 42 in the first embodiment.

The latch structure 20a, like the first embodiment, is formed from a forward extending, aft-mounted cantilevered beam 74a. The beam 74a is formed from an arcuate portion which includes first and second portion 108, 110 and a flat portion 112 extending therefrom. The first portion 108 is inclined and has forward and rearward opposite ends. The second portion 110 is vertical and has first and second opposite ends. The flat portion 112 has forward and rearward opposite ends. The rearward end of the first portion 108 is secured to the top wall 52a of the base portion 44a at point of attachment 116 and may be integrally formed therewith or may be formed as a separate member and suitably mounted thereon. In addition, the first portion 108 may be provided on the top wall 60a of the extending portion 46a. The first portion 108 inclines from the point of attachment 116 upwardly and forwardly to the forward end thereof. The first end of the second, vertical portion 110 is integrally formed with the forward end of the first portion 108 and extends downwardly therefrom toward the top wall 60a such that the second end of the second portion 110 is proximate to the top wall 60a; the rearward end of the flat portion 112 is integrally formed with the second end of the second, vertical portion 110. Thus, except for the point of attachment 116, the beam 74a extends freely forward toward the front end 48a of the plug housing 22a over the extending portion 46a. That is to say, except for the point of attachment 116, the beam 74a can be biased toward the top wall 60a of the extending portion 46a. When not connected with the receptacle 26, the beam 74a may have a bias which is slightly away from the top surface 60a of the extending portion 46a. A projection 107 is provided on the bottom surface of flat portion 112.

Like that of the first embodiment, the engagement structure 76a is formed as a protrusion on the forwardmost end of the beam flat portion 112. The protrusion 76a is identical in structure to that described in the first embodiment and thus a description of the structure is not repeated herein.

The key 72a provided on the extending portion top wall 60a is spaced slightly forward of the forwardmost end of the beam 74a.

To engage the plug housing 22a with the receptacle 26, the forward end of the plug housing 22a is inserted within the receptacle passageway 86 such that the bottom wall 64a of the extending portion 46a slides along the interior of the bottom wall 84. When the beam 74a comes into contact with the top wall 80 of the receptacle 26, the beam 74a flexes toward the top wall 60a of the extending portion 46a. The ramped surface 102a of the protrusion 76a encourages the biasing of the beam 74a toward the top wall 60a. As the plug housing 22a is moved further into the receptacle 26, the second surface 100a of the protrusion 76a slides along the interior of the top wall 80, see FIG. 6, until the protrusion 76a engages the retention aperture 78 through the receptacle top wall 80. Once the protrusion 76a encounters the retention aperture 78, the beam 74a flexes and moves away from the extending portion top wall 60a as a result of the memory in the beam material and the protrusion 76a engages within the retention aperture 78. Specifically, surface 98a of the protrusion 76a engages the rear wall of the aperture 78. This locks the plug housing 22a into place within the receptacle 26 under an axial load. The top and bottom walls 80, 84 of the receptacle 26 are spaced slightly closer together than the distance between the bottom surface of the extending portion 46a and the top surface of the beam 74a in its initial position so that a tight interconnection is provided. If a user attempts to move the beam 74a too close to the top wall 60, the projection 107 will contact the top wall 60 to prevent the beam 74a from being over-stressed.

To disengage this embodiment of the high profile plug housing 22a from the receptacle 26, the user presses on the first portion 108 of the beam 74a which causes the beam 74a to flex and move toward the extending portion top surface 60a. The first portion 108 has a plurality of raised protuberances 114 against which a user's thumb, finger, or equivalent tool can engage. Once the protrusion 76a is completely disengaged from the retention aperture 78, the plug housing 22a can be easily and freely pulled out of the receptacle 26.

Attention is now directed to FIGS. 7 and 8 which illustrates the third embodiment of the plug housing 22b which has the low profile latch structure 20b thereon, and the receptacle 26b in which the connector 24b is mounted.

The receptacle 26b is rectangular-shaped and has a top wall 80b, opposite side walls 82b and a bottom wall 84b. The top and bottom walls 80b, 84b are spaced from each other and the side walls 82b are spaced from each other so as to define a rectangularly-shaped axial passageway 86b which extends through the receptacle 26b. The retention structure 78b is formed as a pair of rectangularly-shaped retention protrusions (only one of which is shown in the cross-sectional view of FIG. 8) are provided in the passageway 86b at predetermined positions. The retention protrusions 78b extend from the top wall 80b into the passageway 86b. A keyway 90b is provided in a forward end of the receptacle passageway 86b.

The latch structure 20b, like that of the first and second embodiments, is formed from a forward extending, aft-mounted cantilevered beam 74b. The beam 74b is formed from a first, vertical portion 120 having first and second opposite ends and a second, horizontal portion 122 having forward and rearward opposite ends. The first end of the first portion 120 is secured to the top wall 60b of the extending portion 46a at point of attachment 124 and may be integrally formed therewith or may be formed as a separate member and suitably mounted thereon. The first end of the first portion 120 may also be provided on the top wall 60a of the extending portion 46a. The first portion 120 extends vertically from the point of attachment 124 to the second end thereof. The rearward end of the second portion 122 is integrally formed with the second end of the first portion 120. The forward end surface 126 of the second portion 120 is ramped such that the end surface 126 inclines downwardly to the underside of the beam 74b. Thus, except for the point of attachment 124, the beam 74b extends freely forward toward the front end 48b of the plug housing 22b over the extending portion 46b. That is to say, except for the point of attachment 124, the beam 74b can be biased toward the top wall 60b of the extending portion 46b. When not connected with the receptacle 26b, the beam 74b may have a bias which is slightly away from the top surface 60b of the extending portion 46b.

In the low profile embodiment of the latch structure 20b, the engagement structure 76b is formed as a pair of notches in the forward end of the beam second portion 122 rearward of the ramped end surface 126. The notches 76b define a portion of the second portion 122 which has a lesser width than the remainder of the second portion 122. Each notch 76b defines forward and rearward shoulders 128, 130, respectively, therein. As best shown in FIG. 7, the beam 74b has generally a "t" shape.

The key 72b provided on the top wall 60b of the extending portion 46b is spaced slightly forward of the forwardmost end of the beam 74b.

To engage the low profile plug housing 22b with the receptacle 26b, the forward end of the plug housing 22b is inserted within the receptacle passageway 86b such that the bottom wall 64b of the extending portion 46b slides along the interior of the receptacle bottom wall 84b. When the ramped end surface 126 of the beam 74b comes into contact with the retention protrusions 78b within the receptacle passageway 86b, the beam 74b flexes toward the extending portion top wall 60b. The ramped end surface 126 encourages the biasing of the beam 74b toward the top wall 60b. Once the ramped end surface 126 travels past the retention protrusions 78b and the retention protrusions 78b encounter the engagement notches 76b, the beam 74b flexes and moves away from the top wall 60b of the extending portion 46b as a result of the memory in the beam material so as to engage the retention protrusions 78b within the notches 76b. That is, the shoulder 128 in each notch 76b engages the forward surface of each retention protrusion 78b within the receptacle 26b. This retains the plug housing 22b within the receptacle 26b under an axial load. The inwardmost surfaces of the retention protrusions 78b and the interior of the bottom wall 64b are spaced closer together than the distance between the bottom surface of the extending portion 46b and the top surface of the beam 74b in its initial position so that a tight interconnection is provided when the plug housing 22b is fully inserted into the receptacle 26b. Because the beam 74b engages the retention protrusions 78b within the passageway 86b, the height of the plug 22b can be minimized. The forward end of the beam 74b can enter into the keyway 90b.

To disengage the low profile plug housing 22b from the receptacle 26b, the user presses on the second portion 122 of the beam 74b which causes the beam 74b to flex and move toward the top surface 60b of the extending portion 46b. Once the beam 74b is flexed sufficiently toward the top surface 60b, the retention protrusions 78b completely disengage from within the notches 76b and the plug housing 22b can be easily and freely pulled out of the receptacle 26b.

An advantage in this low profile embodiment of the plug housing 22b is that the outer wall of the receptacle 26b is solid which deters the entry of contaminants therein.

The deflector 132 may be provided on the beam 74, 74b in the first or third embodiments, (only shown in the first embodiment in the drawings), and is mounted on the freely extending portion of the beam 74, 74b. To release the plug housing 22, 22b, the user presses on the deflector 132 which causes the beam 74, 74b to flex and move toward the extending portion top surface 60, 60b. Once the engagement structure 76, 76b is completely disengaged from the retention structure 78, 78b, the plug housing 22, 22b is easily pulled out of the receptacle 26, 26b.

In each embodiment, the receptacle 26, 26b can be made as a single piece molding having the retention structure 78, 78b located in association with the top wall 80, 80b or in association with the bottom wall 84, 84b thereof. The single piece construction eliminates assembly operations. Additionally, this allows for the mounting the plug housing 22, 22a, 22b therewithin with the latch structure 20, 20a, 20b facing upwardly or facing downwardly. Thus, if a fiber optic cable, having first and second channels, is mounted within the connector 24, 24a, 24b and receptacle 26, 26b as shown in the drawings, the other fiber optic cable will be flipped such that the beam on the other connector faces downwardly and the retention structure is provided through the bottom wall of the other receptacle. This allows the number one channel of the fiber optic cable which would be mounted in the connector 24, 24a, 24b shown in the drawings to be directly connected to the number one channel of the other fiber optic cable and, likewise, the number two channel of the fiber optic cable which is mounted in the connector 24, 24a, 24b shown in the drawings to be directly connected to the number two channel of the other fiber optic cable. That is to say, the connectors would be "flipped" with respect to each other. Alternatively, the retention structures can be provided in association with the top wall of each receptacle such that the connectors are "fed through". In order to connect the number one channel of the fiber optic cable which is mounted in the connector 24, 24a, 24b shown in the drawings to the number one channel of the other fiber optic cable fiber and to connect the number two channel of the fiber optic cable which is mounted in the connector 24, 24a, 24b shown in the drawings to be directly connected to the number two channel of the other fiber optic cable, the channels must crossed. It should be seen that the receptacle used in the present invention is capable of accepting forward-mounted or aft-mounted latch structures.

Moreover, in each embodiment, when the plug housing 22, 22a, 22b is inserted into the receptacle 26, 26b, the key 72, 72a, 72b slides along and is seated within the receptacle keyway 90, 90b. If the receptacle 26, 26b is formed in a board which has other wires thereon, which other wires may not be fiber optic cables, the key 72, 72a, 72b acts as a shroud and prevents tangling of the other wires with the latch structure 20, 20a, 20b and prevents the wires from becoming engaged underneath the latch structure 20, 20a, 20b because the key 72, 72a, 72b moves the other wires out of the way. Therefore, the key 72, 72a, 72b acts as a shroud to prevent the entanglement of the other wires with the latch structure 20, 20a, 20b.

Because the profile of the latch structure 20, 20a, 20b varies, high lateral compliance and concurrently high axial stiffness are achieved. The longitudinal portions of the latch structure 20, 20a, 20b have a relative small moment of inertia cross-section, whereas transverse portions of the latch structure 20, 20a, 20b have a large moment of inertia cross-section.

A general description of the remainder of the connector 24, 24a, 24b is now described with respect to the first embodiment with the understanding that the other embodiments have identical structures.

The ferrule 28 may be a conventional MT ferrule member mounted within the smaller portion of the extending portion axial passageway 66. The ferrule 28 is formed from glass, plastic, metal or ceramic and has a base portion and a portion which extends forwardly therefrom. The base portion has a top surface, a first side surface, a second side surface and a bottom surface. The extending portion is generally rectangularly-shaped and has a top surface, a first side surface, a second side surface and a bottom surface. The top and bottom surfaces of the base portion are spaced apart from each other further than the top and bottom surfaces of the extending portion are spaced apart from each other, and the side surfaces of the base portion are spaced apart from each other further than the side surfaces of the extending portion are spaced apart from each other. A polished, flat end surface is provided on the forward end of the ferrule member 28 for abutting against the end surface of another ferrule member in a typical interconnection. A pair of axial outer bores are provided through the ferrule member 28. Such outer bores are respectively proximate to the side walls of the ferrule member 28. A pair of axial, inner bores are provided through the ferrule member 28 at a position between the outer bores. The outer bores respectively accept a guide pin therethrough and the guide pins extend outwardly from the forward end of the ferrule member 28. The inner bores respectively accept a channel of the fiber optic cable therethrough. When the ferrule member 28 is mounted within the plug housing 22, the base portion thereof seats within the larger portion of the axial passageway 66 and the extending portion seats within the smaller portion of the axial passageway 66. A front portion of the ferrule member 28, which has the end surface, extends slightly forwardly from the front end 48 of the plug housing 22. Alternatively, the ferrule member 28 can be a single fiber mounting member.

The U-shaped guide pin clip 30 is formed from plastic and includes opposite side walls and a bottom wall which connects the side walls together. As shown in FIGS. 3 and 4, the guide pin clip 30 is mounted within the larger portion of the axial passageway 66 through the extending portion 46 and is used to retain the rearward ends of the guide pins in place through the ferrule member 28. When the guide pin clip 30 is mounted within the passageway 66, the side walls of the guide pin clip 30 are proximate to the side walls of the axial passageway 66 and the bottom wall of the guide pin clip 30 is proximate to the bottom wall of the passageway 66. The clip 30 abuts against the rear end of the ferrule member 28.

The spring push member 34 is formed from plastic and includes a cylindrical portion, a rectangular portion integrally formed therewith and a pair of cantilevered arms extending from the rectangular portion. The arms are spaced apart from each other. Each arm has a latch member protruding outwardly therefrom which engages with the respective apertures provided through the side walls of the connector. An aligned axial passageway is formed through the cylindrical portion and the rectangular portion. The arms are positioned on the rectangular portion such that the axial is not blocked.

As shown in the cross-sectional drawings, the coiled spring 32 is mounted between the spring push member 34 and the guide pin clip 30. The front end of the spring 32 abuts against the guide pin clip 30 and the rear end of the spring 32 is positioned between the arms of the spring push member 34 and engages against the rectangular portion thereof. To mount the spring push member 34 to the plug housing 22, the arms are pushed into the rear end of the plug housing 22 until the latches on the arms engage within the apertures 70 in the extending portion side walls 62. The axial passageway through the spring push member 34 aligns with the axial passageway 66 through the plug housing 22. The apertures 70 in the side walls are larger than the latches so as to allow the latches to move therewithin and thus, to allow the spring push member 34 to slide relative to the plug housing 22. The spring push member 34 pushes on the spring 32, which in turn, pushes on the guide pin clip 30 and the ferrule member 28. This provides for a "floating" design of the ferrule member 28 and provides for a forward bias on the fiber optic cable when mounted in the connector 24 as described herein such that the optical fibers in the fiber optic cable will maintain a physical connection with the optical fibers in the other fiber optic cable (not shown) as is known in the art. While a coiled spring 32 is disclosed herein, it is to be understood that other forward biasing means can be provided.

The crimpable eyelet 36 is formed from a thin frusto-conical wall which has a first thin, cylindrical wall integrally formed at its forward end and a second thin, cylindrical wall integrally formed at its forward end. The first cylindrical wall has a larger diameter than the second cylindrical wall such that the frusto-conical wall tapers from its forward end to its rearward end. An axial passageway is formed through the eyelet 36 and has a first cylindrical portion within the first wall, a frusto-conical portion within the frusto-conical portion thereof and a second cylindrical portion within the second wall. The first portion has a larger diameter than the second portion that the frusto-conical portion of the passageway tapers from its forward end to its rearward end. The larger diameter first wall is crimped onto the cylindrical portion of the spring push member 34 to maintain the engagement of the crimpable eyelet 36 with the spring push member 34.

The strain relief boot 38 is formed from a suitably compliant material which can be repeatedly bent in a limited bend radius so as to protect the optic fibers in the fiber optic cable mounted therein. Such a suitable material is thermoplastic elastomer. The boot 38 also provides strain relief for the fiber optic cable. The boot 38 is formed from a forward cylindrical portion and a rearward frusto-conical portion. The portions are integrally formed with each other. An axial passageway is formed through the strain relief boot 38. A forward portion of the axial passageway is cylindrical, a middle portion of the axial passageway is frusto-conical and a rearward portion of the axial passageway is cylindrical. The cylindrical portion of the crimpable eyelet 36 is mounted within the cylindrical portion of the axial passageway of the strain relief boot 38 and the frusto-conical portion of the crimpable eyelet 36 is mounted within the frusto-conical portion of the axial passageway of the strain relief boot 38. The cylindrical portion and the frusto-conical portion of the crimpable eyelet 36 and the cylindrical portion and the frusto-conical portion of the axial passageway of the strain relief boot 38 are identically formed so that a tight interconnection is provided between these components.

The crimpable eyelet 36 and the strain relief boot 38 are used to mount the fiber optic cable within the connector 24. When a fiber optic cable is mounted to the connector 24, the strength yarns in the fiber optic cable are compressively held between the crimpable eyelet 36 and the spring push member 34. The jacket is cut back to expose the strength yarns and the optical fibers and the end of the jacket is compressively held by the crimpable eyelet 36 at the rearward end thereof between the crimpable eyelet 36 and the rearward end of the spring push member 34. The optical fibers are stripped of their coating and covering and are extended through the aligned axial passageways in the spring push member 34 and the plug housing 22, through the center of the U-shaped guide pin clip 30 and through the inner bores of the ferrule member 28 and out of the forward end thereof for connection to another fiber optic cable in a known manner. It is to be understood that instead of providing a crimpable eyelet 26, a suitable adhesive can be used to join the strength yarns and/or the jacket of the fiber optic cable to the spring push member 34.

While preferred embodiments of the present invention are shown and described, it is envisioned that those skilled in the art may devise various modifications of the present invention without departing from the spirit and scope of the appended claims.

The invention claimed is:

1. A connector comprising: a plug housing formed from a member having a forward end and a rearward end and an axial passageway therethrough through which at least one optical fiber provided in a fiber optic cable can extend, said member having at least a portion which is rectangularly-shaped, said rectangularly shaped portion having a top wall, opposite side walls and a bottom wall, said top wall being flat, said forward end of said member for insertion into a receptacle with said rearward end extending from the receptacle, and a cantilevered beam having an end fixed to a rearward portion of said member and having its free end extending forwardly toward said forward end of said member over said flat top wall and being spaced from said flat top wall, said free end of said cantilevered beam being capable of being biased toward said flat top wall of said member, said cantilevered beam having engagement structure thereon for engaging retention structure associated with the receptacle for releasably securing said connector within the receptacle; a ferrule member mounted within said plug housing; and means for biasing said ferrule member toward said forward end of said plug housing member.

2. A connector as defined in claim 1, wherein said engagement structure on said cantilevered beam comprises a protrusion which is adapted for engagement within an aperture through a wall of the receptacle.

3. A connector as defined in claim 1, wherein said engagement structure on said cantilevered beam comprises at least one notch in said beam which is adapted for engagement with a corresponding protrusion in the receptacle.

4. A connector as defined in claim 1, further including a key provided on said member and adapted for insertion into a keyway in the receptacle, said key projecting from said member and being positioned on said member proximate to said member forward end and spaced from said free end of said cantilevered beam.

5. A connector as defined in claim 1, wherein said cantilevered beam includes an arcuate portion and a flat portion which extends therefrom, said engagement structure being provided on a forward end of said flat portion.

6. A connector as defined in claim 1, further including at least one raised protuberance on said cantilevered beam against which a user's thumb finger or equivalent tool can engage.

7. A connector as defined in claim 1, further including a deflector provided on said cantilevered beam and adapted for manual actuation thereof to bias said beam toward said member.

8. A connector comprising: a plug housing formed from a member having a forward end and a rearward end and an axial passageway therethrough through which at least one optical fiber provided in a fiber optic cable can extend, said forward end of said member for insertion into a receptacle with said rearward end extending from the receptacle, a cantilevered beam having an end fixed to a rearward portion of said member and having its free end extending forwardly toward said forward end of said member, said free end of said cantilevered beam being capable of being biased toward said member, said cantilevered beam having engagement structure thereon for engaging retention structure associated with the receptacle for releasably securing said connector within the receptacle, and a key provided on said member and adapted for insertion into a keyway in the receptacle, said key projecting from said member and being positioned on said member proximate to said member forward end and being spaced from the free end of said cantilevered beam; a ferrule member mounted within said plug housing; and means for biasing said ferrule member toward said forward end of said plug housing member.

9. A connector as defined in claim 8, wherein said engagement structure on said cantilevered beam comprises a protrusion which is adapted for engagement within an aperture through a wall of the receptacle.

10. A connector as defined in claim 8, wherein said engagement structure on said cantilevered beam comprises at least one notch in said beam which is adapted for engagement with a corresponding protrusion in the receptacle.

11. A connector as defined in claim 8, wherein said cantilevered beam includes an arcuate portion and a flat portion which extends therefrom, said engagement structure being provided on a forward end of said flat portion.

12. A connector as defined in claim 8, further including at least one raised protuberance on said cantilevered beam against which a user's thumb finger or equivalent tool can engage.

13. A connector as defined in claim 8, further including a deflector provided on said cantilevered beam and adapted for manual actuation thereof to bias said beam toward said member.

14. A connector comprising: a plug housing formed from a member having a forward end and a rearward end and an axial passageway therethrough through which at least one optical fiber provided in a fiber optic cable can extend, said forward end of said member for insertion into a receptacle with said rearward end extending from the receptacle, a cantilevered beam having an end fixed to a rearward portion of said member and having its free end extending forwardly toward said forward end of said member, said free end of said cantilevered beam being capable of being biased toward said member, and said cantilevered beam having at least one notch in said beam which is adapted for engagement with a corresponding protrusion in the receptacle for releasably securing said connector within the receptacle; a ferrule member mounted within said plug housing; and means for biasing said ferrule member toward said forward end of said plug housing member.

15. A connector as defined in claim 14, wherein a key is provided on said member and adapted for insertion into a keyway in the receptacle, said key projecting from said member and being positioned on said member proximate to said member forward end and spaced from the forward end of said cantilevered beam.

16. A connector as defined in claim 14, further including a deflector provided on said cantilevered beam and adapted for manual actuation thereof to bias said beam toward said member.

17. A connector comprising: a plug housing member having a forward end and a rearward end and an axial passageway therethrough through which at least one optical fiber provided in a fiber optic cable can extend, said forward end of said plug housing member for insertion into a receptacle with said rearward end extending from the receptacle, a cantilevered beam including an arcuate portion said beam having an end fixed to a rearward portion of said plug housing member and a flat portion which extends from said arcuate portion and defining a free end which extends forwardly toward said forward end of said plug housing member, a protrusion which is adapted for engagement within an aperture through a wall of a receptacle provided on said free end of said cantilevered beam for releasably securing said connector within the receptacle, said cantilevered beam being capable of being biased toward said plug housing member; a ferrule member mounted within said plug housing member; and means for biasing said ferrule member toward said forward end of said plug housing member.

18. A connector as defined in claim 17, wherein said member has at least a portion which is rectangularly-shaped, said rectangularly shaped portion having a top wall, opposite side walls and a bottom wall, said top wall being flat, said free end of said cantilevered beam extending forwardly toward said forward end of said member over said flat top wall and being spaced from said flat top wall, said free end of said cantilevered beam being capable of being biased toward said flat top wall of said member.

19. A connector as defined in claim 17, further including at least one raised protuberance on said arcuate portion of said cantilevered beam against which a user's thumb finger or equivalent tool can engage.

20. A connector as defined in claim 17, further including a deflector provided on said arcuate portion of said cantilevered beam and adapted for manual actuation thereof to bias said beam toward said member.

21. A connector as defined in claim 17, further including a key provided on said member and adapted for insertion into a keyway in the receptacle, said key projecting from said member and being positioned on said member proximate to said member forward end and spaced from the free end of said cantilevered beam.

22. A plug housing for a connector for terminating a fiber optic cable or other similar member, said plug housing comprising: a member having a forward end and a rearward end and an axial passageway therethrough through which at least one optical fiber provided in the fiber optic cable can extend, said forward end adapted for insertion into a receptacle with said rearward end extending from the receptacle, and a cantilevered beam having an end fixed to a rearward portion of said member and having its free end extending forwardly toward said forward end of said member, said free end of said cantilevered beam being capable of being biased toward said member, said cantilevered beam having engagement structure thereon for engaging retention structure associated with the receptacle for releasably securing said connector within the receptacle.

23. A plug housing as defined in claim 22, wherein said engagement structure on said cantilevered beam comprises a protrusion which is adapted for engagement within an aperture through a wall of the receptacle.

24. A plug housing as defined in claim 22, wherein said engagement structure on said cantilevered beam comprises at least one notch in said beam which is adapted for engagement with a protrusion in the receptacle.

25. A plug housing as defined in claim 22, further including a key provided on said member and adapted for insertion into a keyway in the receptacle, said key projecting from said member and being positioned on said member proximate to said member forward end and spaced from the forward end of said cantilevered beam.

26. A plug housing as defined in claim 22, wherein said cantilevered beam includes an arcuate portion and a flat portion which extends therefrom, said engagement structure being provided on a forward end of said flat portion.

27. A plug housing as defined in claim 22, further including at least one raised protuberance on said cantilevered beam against which a user's thumb finger, or equivalent tool can engage.

28. A plug housing as defined in claim 22, further including a deflector provided on said cantilevered beam and adapted for manual actuation thereof to bias said beam toward said member.

* * * * *